United States Patent
McNeely et al.

(10) Patent No.: US 7,929,697 B2
(45) Date of Patent: Apr. 19, 2011

(54) SECURE DATA TRANSMISSION VIA MULTICHANNEL ENTITLEMENT MANAGEMENT AND CONTROL

(75) Inventors: David Lowell McNeely, Indianapolis, IN (US); David Emery Virag, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 879 days.

(21) Appl. No.: 10/591,361

(22) PCT Filed: Mar. 9, 2004

(86) PCT No.: PCT/US2004/007122
§ 371 (c)(1),
(2), (4) Date: Sep. 1, 2006

(87) PCT Pub. No.: WO2005/099151
PCT Pub. Date: Oct. 20, 2005

(65) Prior Publication Data
US 2007/0192586 A1   Aug. 16, 2007

(51) Int. Cl.
*H04L 9/00* (2006.01)
*H04L 9/12* (2006.01)
*H04N 7/167* (2006.01)
(52) U.S. Cl. ......... 380/239; 380/210; 380/200; 380/277
(58) Field of Classification Search .................. None
See application file for complete search history.

(56) References Cited

U.S. PATENT DOCUMENTS

| | | | | |
|---|---|---|---|---|
| 4,802,220 A * | 1/1989 | Marker, Jr. | ............ | 380/33 |
| 5,101,432 A * | 3/1992 | Webb | ............ | 380/33 |
| 5,103,478 A * | 4/1992 | Matyas et al. | ............ | 380/280 |
| 5,574,785 A * | 11/1996 | Ueno et al. | ............ | 380/2 |
| 5,692,130 A * | 11/1997 | Shobu et al. | ............ | 709/229 |
| 6,286,098 B1 * | 9/2001 | Wenig et al. | ............ | 713/151 |
| 6,785,390 B1 * | 8/2004 | Hiraide | ............ | 380/262 |
| 2003/0084284 A1 * | 5/2003 | Ando et al. | ............ | 713/163 |
| 2003/0236064 A1 * | 12/2003 | Shiohara et al. | ............ | 455/1 |
| 2006/0069965 A1 * | 3/2006 | Ito | ............ | 714/100 |

FOREIGN PATENT DOCUMENTS

| | | |
|---|---|---|
| EP | 1 220 541 A2 | 7/2002 |
| EP | 1 220 487 B1 | 11/2005 |
| JP | 2002-261746 | 9/2002 |
| WO | WO 03/081906 A1 | 10/2003 |

OTHER PUBLICATIONS

Search Report.
US 5,103,748, 04/1992, Matyas et al. (withdrawn)

* cited by examiner

*Primary Examiner* — Syed A. Zia
(74) *Attorney, Agent, or Firm* — Robert D. Shedd; Paul P. Kiel

(57) ABSTRACT

A method for communicating data, such as audio/video (AV) data, over plural channels involves selecting data and encryption information, and encrypting the data with the encryption information to thereby produce encrypted data. The encryption information is broken into portions. The encrypted data is communicated by way of at least one of the plural channels, and at least some portions of the encryption information are communicated over at least one channel other than that one over which the encrypted data is communicated. In a more general case, the encrypted data is sent over one channel, and the encryption information is divided and sent over several other channels.

19 Claims, 7 Drawing Sheets

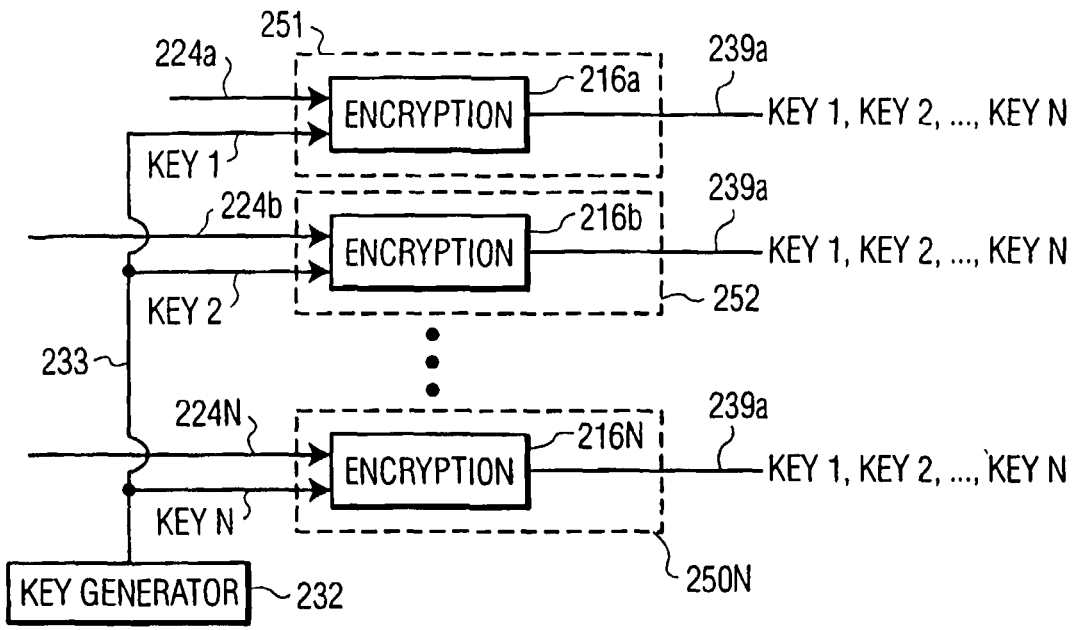
FIG. 6
FIG. 7a
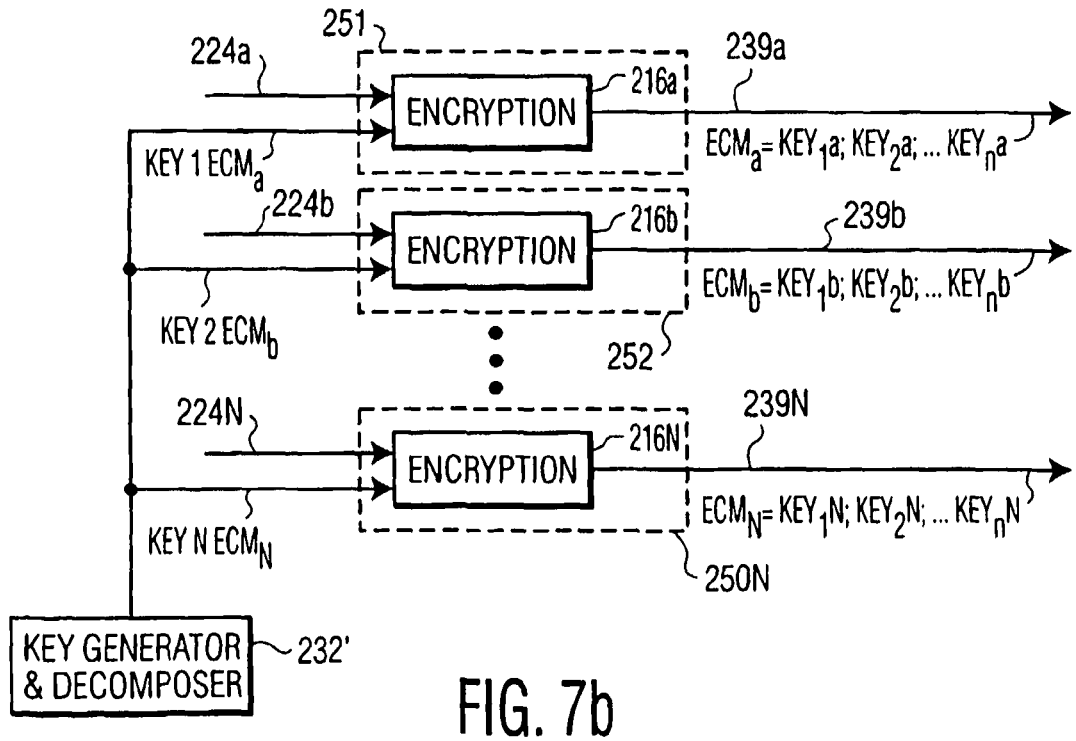
FIG. 7b

| TRANSPONDER 1 | $V_1$ | $V_1$ | $A_1$ | $E_1$ | $V_1$ | $V_1$ | $A_1$ | $E_1$ | $V_1$ | $V_1$ | $A_1$ | $E_1$ | ••• |
|---|---|---|---|---|---|---|---|---|---|---|---|---|---|
| TRANSPONDER 2 | $V_2$ | $V_2$ | $A_2$ | $E_2$ | $V_2$ | $V_2$ | $A_2$ | $E_2$ | $V_2$ | $V_2$ | $A_2$ | $E_2$ | ••• |
| ⋮ | | | | | | | | | | | | | |
| TRANSPONDER n | $V_n$ | $V_n$ | $A_n$ | $E_n$ | $V_n$ | $V_n$ | $A_n$ | $E_n$ | $V_n$ | $V_n$ | $A_n$ | $E_n$ | ••• |

FIG. 8a

| TRANSPONDER 1 | $V_1$ | $V_1$ | $A_1$ | $E_1$ | $V_1$ | $V_1$ | $A_1$ | $E_2$ | $V_1$ | $V_1$ | $A_1$ | $E_n$ | ••• |
|---|---|---|---|---|---|---|---|---|---|---|---|---|---|
| TRANSPONDER 2 | $V_2$ | $V_2$ | $A_2$ | $E_2$ | $V_2$ | $V_2$ | $A_2$ | $E_n$ | $V_2$ | $V_2$ | $A_2$ | $E_1$ | ••• |
| ⋮ | | | | | | | | | | | | | |
| TRANSPONDER n | $V_n$ | $V_n$ | $A_n$ | $E_n$ | $V_n$ | $V_n$ | $A_n$ | $E_1$ | $V_n$ | $V_n$ | $A_n$ | $E_2$ | ••• |

FIG. 8b

SECURE DATA TRANSMISSION VIA MULTICHANNEL ENTITLEMENT MANAGEMENT AND CONTROL

This application claims the benefit, under 35 USC 365 of International Application PCT/US2004/007122, files Mar. 9, 2004, which was published in accordance with PCT Article 21(2) on Oct. 20, 2005 in English.

FIELD OF THE INVENTION

This invention relates to the transmission of plural streams of information over separate channels, and more particularly to the spreading of encoding information and transmission of portions thereof by way of separate channels.

BACKGROUND OF THE INVENTION

Electronic transmission of information to each of a plurality of users or subscribers of an information providing service is now common, as exemplified by satellite and cable system delivery of television and audio information. FIG. 1 is a simplified block diagram of a satellite system 10 for delivering information to multiple subscribers or users located over a large area. In FIG. 1, a ground station 12 with at least an uplink antenna 14 provides streams of information to a receiving or uplink antenna 22 of a spacecraft 20. The spacecraft 20 may be in a geosynchronous orbit, which remains at an apparently fixed location in the sky, as seen from a plurality of users 1, 2, ..., N. Users 1, 2, ..., N are located in a coverage area 26 of the beam, illustrated as 25, of a spacecraft transmitting or downlink antenna 24. A ground station, which may be ground station 12 or another ground station, also provides control functions for maintaining the spacecraft 20 in proper orbit and operating condition.

The streams of uplink information transmitted by ground station 12 of FIG. 1 and its antenna 14 to uplink antenna 22 of spacecraft 20 may be somewhat processed in the spacecraft 20, but the spacecraft and its antennas can often be viewed as being simply a "bent pipe" which retransmits the uplinked information streams along a downlink path by way of downlink beam 25. The uplink and downlink operating frequencies often differ, for reasons related to the gain of user receiving antennas relative to those of a ground station, and possibly also because of the relative efficiencies of electronic components at the different uplink and downlink frequencies.

Ideally, spacecraft 20 would include a "transponder" which would receive all the uplinked signals, amplify them, and retransmit the amplified signal along downlink beam 25 to the users. However, because of limitations on the undistorted power available from available transponders, many transponders are used, each operating at a somewhat different frequency within the available uplink/downlink frequency band. In one current application, the spacecraft includes thirty-two transponders or physical channels, each of which handles multiple separate programs. A program may include several primary streams of data, such as audio and video and security data.

In the abovementioned current application, the signal streams are in digital form, and the primary program streams are time-division multiplexed (TDM) within the channel defined by the transponder. Those skilled in the art know that such time division multiplexing requires advanced controls for assigning the information packets of the various independent signal channels to the signal path without overlap of the packets. The downlink signals arriving at the user terminals 1, 2, ..., N of FIG. 1 by way of antenna beam 25 are so encoded.

In addition, the information content sent over the satellite communication system may be "scrambled" or encoded in some additional way, not related to the mode of delivery over the spacecraft, to thereby prevent use of the content by persons not entitled to the content by virtue of having paid for access. In this manner, an appropriately programmed smartcard or security module is needed in order to receive the downlinked information. For example, all subscribers to the satellite system may have access to certain channels, and for this purpose they require at least the slot encoding information. While access to the encoding information may make it possible for a user to correctly receive the transmitted information on a premium channel, that transmitted information may be subject to an additional layer of encoding for which the non-paying subscriber does not have the key. Thus, a multiple-tier system is provided.

The operator of the satellite information video (and associated audio) delivery system controls the use of the delivered information stream by the use of Entitlement Control Messages (ECM) and Entitlement Management Messages (EMM). Entitlement Control Messages allow conditional access to the keys for decrypting the video stream of interest, and are delivered to the user as an integrated part of the video program, which is to say within the same physical channel as the program content. In the case of ordinary broadcast video, the physical channel is 6 MHz "wide." In the case of a cable television system, the Entitlement Control Message may be delivered on a separate, dedicated "out-of-band" channel requiring a separate or secondary tuner. This may be done so that a user can receive security information while simultaneously viewing a traditional analog television signal in which there is no mechanism for the transmission of security information.

Typically, ECMs contain the keys necessary to descramble the program in addition to a description of the tier of subscription required to access the program. The ECMs are delivered as an MPEG transport packet, possibly every 10 milliseconds, and change periodically, possibly every 30 seconds. The ECMs are identified by the program ID number (PID) of the packet. This information is typically available through the system program guide or program map information. As a user tunes a desired channel, the receiver queries the guide information to find the PID associated with the ECM to gain access to the audio/visual streams. The receiver then finds the ECM packets related to the desired programming and passes these packets to a smart card or security module for processing. The security module opens the packets and compares the access rights of the program with the subscription level of the receiver. If the subscription level of the receiver is sufficient to permit viewing of the program, the security module decodes the decryption key and makes it available for descrambling of the program content. For those programs which exceed the current subscription level of the receiver, those keys are not made available and the receiver will not be able to descramble the content.

Entitlement Management Messages (EMM) are encrypted packets that allow for managing the rights of the receiving users to receive or not receive program content or data. EMMs are ordinarily sent to the user with a lower priority or lesser urgency than the Entitlement Control Messages (ECMs). The EMMs can be delivered in the same physical channel or in other physical channels, so long as the receiver knows a priori where and when to find them. In receivers with limited tuners, EMMs are typically transmitted simultaneously on all the physical channels to ensure that the receiver can always receive the EMM information regardless of the channel to which the receiver is currently tuned. EMMS are delivered as part of an MPEG transport stream and identified with a specific PID in a manner similar to that of the ECMs. An electronic address that can be associated with one or more receivers is typically found within the EMM packet. Typically, the receiver will look at all ECM packets delivered by the network and compare the receiver electronic address with the electronic address delivered in the EMM. If the addresses match, the EMM message is intended for the receiver, and the receiver will act in accordance with the information delivered by the EMM.

FIG. 2a is a simplified block diagram of processing which is performed at the head end or a ground station of a system for transmitting audio/video material to subscribers by way of a satellite. In FIG. 2a, a set 250 including a plurality of signal processors 251, 252, 250N each receives one of a plurality of input signal streams. In one embodiment, eight channels of audio-video (AV) information are applied to each processor of set 250. Each processor processes its own set of input AV information, and produces MPEG-encoded, time-division multiplexed, channelized radio-frequency information at its output terminal, for application by way of a combining (comb) arrangement illustrated as 260 to antenna 14 of FIG. 1.

FIG. 2b is a simplified block diagram of the processing 252 which is performed for one physical channel of FIG. 2a. It should be understood that a channel in the arrangement of FIG. 2b corresponds to a spacecraft transponder channel, because of the need to limit the number of signals traversing each spacecraft transponder channel. For definiteness, FIG. 2b represents physical channel 252 of FIG. 2a. In FIG. 2b, a plurality of audio/video sources or signal streams, which in one embodiment includes eight AV streams, are applied to the system. The eight audio/video streams of FIG. 2b are designated "transponder channel II," thereby representing by a roman numeral that these signals are related to the "second" spacecraft transponder channel. The eight AV streams are applied over a plurality of signal paths 210a, 210b, . . . , 210N to a corresponding plurality of MPEG encoders 212a, 212b, . . . , 212N. MPEG encoding is advantageous for limiting or controlling the bandwidth of each video stream. Other compression techniques could also be used. It should be understood that some content channels may contain information other than video, which may require other encoding. The MPEG-encoded signals are transmitted from encoders 212a, 212b, . . . , 212N by way of paths 214a, 214b, . . . , 214N, respectively, to a transport multiplexer (MPX) 216. In addition to the MPEG-encoded content, the MPEG-encoded Transport multiplexer also receives user guide information over a path 217 from a block 218 and dummy EMM/ECM information over a path 219 from a block 220. The dummy EMM/ECM information is merely a "place holder" in the multiplexed data stream for the actual EMM/ECM information which will be transmitted. Transport multiplexer 216 combines the input information onto a single path 224. In one version of the prior art, the multiplexing is performed in a time-division-multiplex (TDM) manner, in which the information to be transmitted is broken into "packets," which are then interleaved in time. The multiplexed information from multiplexer 216 is applied over a path 224 to an encryption apparatus illustrated as a block 230. Encryption block 230 encrypts the multiplexed data stream using a key provided over a path 233 by a key generator 232.

Encryption apparatus 230 of FIG. 2b also substitutes the key and access information into the space occupied in the incoming data stream by the dummy EMM/ECM bits. This step is illustrated in FIG. 2c, in which the stream of dummy ECM information currently traversing the encryptor is illustrated as 290. In FIG. 2c, the ECM information is inserted into the blank or dummy ECM. The ECM information contains the keys associated with a single program and information regarding the purchase rights necessary for a receiver to gain access to the keys. This ECM packet may be further encrypted with a high level system key to limit access. In FIG. 2c, the entire content K1 is illustrated as being decomposed into smaller sub-units K1a, K1b, K1c, . . . , K1X, representing all the information and keys associated with program 1. The resulting stream of encrypted TDM-multiplexed information produced by encryption block 230 of FIG. 2b, with its EMM/ECM information, is sent over a path 239 to a conventional transmitter, illustrated as a Modulator and Power Amp block 240. Transmitter block 240 modulates the signal onto one or more carriers, and raises the power of the signal. The resulting modulated, high power signal is sent from transmitter block 240 of FIG. 2b to combiner 260 of FIG. 2a for combination with other streams of modulated, high power signals and for application of the combined signals to antenna 14 of FIG. 1 for transmission to the spacecraft 20. The carrier frequency (frequencies) onto which the signals are modulated by each processor of set 250 of FIG. 2a is often selected in conjunction with the capabilities of the spacecraft to aid in separation of the modulated carriers into the available transponder channels of the spacecraft.

At the spacecraft 20 of FIG. 1, the uplinked groupings of channels are frequency-converted and amplified for retransmission to Earth. FIG. 3 is a simplified block diagram of the processing at the spacecraft. In FIG. 3, receiving or uplink antenna 22 receives the uplinked encoded TDM signals and couples the signals to a frequency separation filter 310, which routes the signals, according to their frequencies, by way of a plurality of signal paths designated 312a, 312b, . . . , 312N to a like plurality of transponders 301, 302, . . . , 300N. Each transponder illustrated in FIG. 3 includes a low-noise amplifier (LNA) for amplifying the received signals to compensate for path and other losses. It should be understood that the LNA could precede, rather than follow, the frequency separation filter 310. Each transponder 301, 302, . . . , 300N also includes a frequency converter, for converting the uplink frequency of each group of channels to a different frequency for transmission over a downlink to the users on Earth. The downlink frequencies are different among the groups of channels, for easy frequency separation. Each transponder of FIG. 3 also includes a power amplifier, for amplifying the frequency-converted signals in the transponder channel, to aid in overcoming losses in the downlink signal path to the user. The frequency-converted, amplified signals produced at the output of each channel 301, 302, . . . , 300N are applied to a combining arrangement, which may be a frequency-sensitive combiner, for forming a combined downlink signal for application to the downlink antenna 24 of FIG. 1.

FIG. 4 illustrates an arrangement 426 which might be found at a user, such as at user 2 of set 26 of users of FIG. 1. In FIG. 4, the user 2 includes an antenna 414 directed toward the spacecraft 20 of FIG. 1, for receiving the downlink signal, possibly including 32 transponder channels, each carrying the time-division information from eight audio/video channels together with EMM/ECM information. A receiver illustrated as a block 410 in FIG. 4 selects for reception one of the 32 downlinked channels, and produces on a signal path illustrated as 412 the stream of corresponding data. A transport demultiplexer or demultiplexor (deMux) block 416 receives the time-division multiplexed data stream and the encryption codes. The ECM information is provided to a smartcard or security module illustrated as 417 that compares the codes with the authorizations of the local user, and if authorized, provides keys for the transport demultiplexer 416 to descramble, decompress, and process the program for viewing on a television receiver 418 according to the selected audio/visual channel.

FIG. 7a illustrates the general tenor of the key distribution in the prior-art arrangement illustrated with reference to FIGS. 1, 2a, 2b, 2c, 3, and 4. As illustrated in FIG. 7a, each of the encryption blocks 216a, 216b, . 216N of the various processors 251, 252, . . . , 250N, respectively, of each of the physical channels, receives, over a path 233, keys produced by key generator 232. Each of the encryption blocks receives the keys for programs carried over the physical channel associated with the processor, and encodes the keys in the form of ECMs for the physical channel onto the signals traversing its own physical channel.

Non-legitimate access to the content of a system such as that set forth above in conjunction with FIGS. 1, 2a, 2b, 3, and 4 can be gained by compromising either the ECM or the EMM streams distributed to a receiver. In the case of ECM, a hacker would likely enable the viewing of a particular program or program segment, while in the case of the EMM, the hacker would potentially generate access to all encrypted materials on the network for an indefinite period of time. The hacker needs only to access the single physical channel in which the ECM or EMM information is delivered, and store the information for analysis and information extraction. This can be accomplished in the arrangement of FIG. 4 by the use of a computer illustrated as a block 420 connected to receive the audio/video data stream and the EMM/ECM data on signal path 412. The analysis can be done off-line once the information is stored. Once the hacker has succeeded in breaking the ECM, he can access all programming which uses the same ECM, and if the EMM can be determined, he can access all materials.

Improved or alternative information delivery systems are desired.

SUMMARY OF THE INVENTION

A method according to an aspect of the invention is for communicating data over plural channels. The method comprises the steps of selecting data to be communicated, encryption information, and encrypting the data with the encryption information to thereby produce encrypted data. The selected data may be video information. The encryption information is broken into portions. The encrypted data is communicated by way of at least one channel of the plural channels. In one mode of the method, the encrypted data is communicated over but a single channel. At least some of the portions of the encryption key information are communicated over at least one of the plural channels other than a channel over which the encrypted data is communicated.

According to another aspect of the invention, a method for providing program information to subscribers comprises the steps of selecting a plurality of information streams to be communicated to the subscribers, and encoding each of at least some of the information streams with individual entitlement control information to thereby generate entitlement encoded information streams. Each element of the individual entitlement control information is broken into plural portions. The encoded information streams are communicated to the subscribers, with each of the encoded information streams being communicated over one or more of a plurality of independent channels. The plural portions of the entitlement control information are communicated to the subscribers, with at least some of the portions of each entitlement control information being communicated over separate ones of the independent channels. When different subscribers have different program entitlements, the method comprises the further step of generating individual entitlement management commands identifying those information streams of a particular program to which a corresponding subscriber is entitled. Each of the individual entitlement management commands is broken into plural portions. The entitlement management commands are communicated to the subscribers over at least some of the independent channels, with at least some of the portions of each of the individual entitlement management commands being communicated over separate ones of the independent channels. At each subscriber location, the information is simultaneously decoded in at least plural ones of the independent channels to thereby form decoded information. From the decoded information, at least that one of the individual entitlement management commands applicable to the subscriber is reconstituted, to thereby form a reconstituted entitlement management command. According to a further mode of this aspect of the method of the invention, only those of the information streams, entitlement encoded information streams, and entitlement control information corresponding to the reconstituted entitlement management command are made available.

A method according to another aspect of the invention is for providing program information to subscribers, where each subscriber has one of a plurality of different program entitlements. This method comprises the steps of selecting a plurality of information streams to be communicated to the subscribers, and encoding each of at least some of the information streams with individual entitlement control information to thereby generate entitlement encoded information streams. According to this aspect of the invention, the method breaks each element of the individual entitlement control information into plural portions. The information streams are communicated to the subscribers, with each of the information streams being communicated over one of a plurality of independent channels. The plural portions of the entitlement control information are communicated to the subscribers, with at least some of the portions of each individual entitlement control information being communicated over separate ones of the independent channels. Individual entitlement management commands are generated, identifying those information streams of a particular program to which a corresponding subscriber is entitled. Each of the individual entitlement management commands is broken into plural portions. The entitlement management commands are communicated to the subscribers over at least some of the independent channels, with at least some of the portions of each of the individual entitlement management commands being communicated over separate ones of the independent channels. At each subscriber location, the information in at least plural ones of the independent channels is simultaneously decoded to thereby form decoded information, and from the decoded information, at least that one of the individual entitlement management commands applicable to the subscriber is reconstituted, to thereby form a reconstituted entitlement management command. At each the subscriber location, only those of the information streams, entitlement encoded information streams, and entitlement control information corresponding to the reconstituted entitlement management command is made available for display.

BRIEF DESCRIPTION OF THE DRAWING

FIG. 6 is a representation of the manner in which the key information is transmitted in a given transponder channel;

FIGS. 7a and 7b illustrate the general tenor of the key distribution for the prior art and according to an aspect of the invention, respectively;

FIG. 8a illustrates an information stream in a conventional television system; and FIG. 8b illustrates an information stream in accordance with the present principles.

DESCRIPTION OF THE INVENTION

According to an aspect of the invention, the Entitlement Control Messages (ECM) and Entitlement Management Messages (EMM), or at least one of them, or their equivalent, are broken into different portions or parts, and each of the portions or parts is transmitted to the user or subscriber location by means of a separate channel of the system. In the context of a satellite-based video distribution system (where the term "video" includes its associated audio), the ECM andor the EMM keys are broken into plural portions or pieces, and each of the plural portions is transmitted from the spacecraft to the users on a separate one of the independent transponders of the spacecraft. In the abovementioned example, there are 32 discrete transponders over which content is transmitted, so the ECM andor EMM keys can be broken into as many as 32 parts, with one part being distributed on each of the transponder channels. In the case of a cable television system, there is only one physical channel, which is divided into a plurality of frequency bands, each containing one part of the ECM and EMM keys. At the authorized user or subscriber location, the downlinked channels are all recovered, as, for example, by providing one conventional receiver for each transponder channel, and the key portion information is made simultaneously available to the user. The division of the keys into multiple portions is reversed, and the keys become available for use by the user.

In a particularly advantageous embodiment of the invention, the receiver, instead of being a group of conventional receivers, is instead a multi-channel signal receiver such as that described in PCT Patent application 03/08365, filed Mar. 19, 2003 for McNeely. The McNeely application describes a receiver which enables a plurality of frequency channels to be simultaneously tuned so that broadcast channel programs included within the frequency channels may be simultaneously accessed. Signal processing circuitry including a filter bank is coupled to the signal source, and is operative to simultaneously provide baseband signals corresponding to the plurality of broadcast channel programs.

The simultaneous reception provided by the receiver of the abovementioned PCT application is accomplished, at least in part, by alias cancellation. The alias-cancelling reception provides a way to apply digital signal processing to radio-frequency (RF) signals, with relatively low clock rates. Those skilled in the art know that the term "radio frequency," previously understood in a restricted manner, now has a meaning which embraces virtually all signal frequencies other than those in the range of visible light and ionizing radiation.

Figure 1:
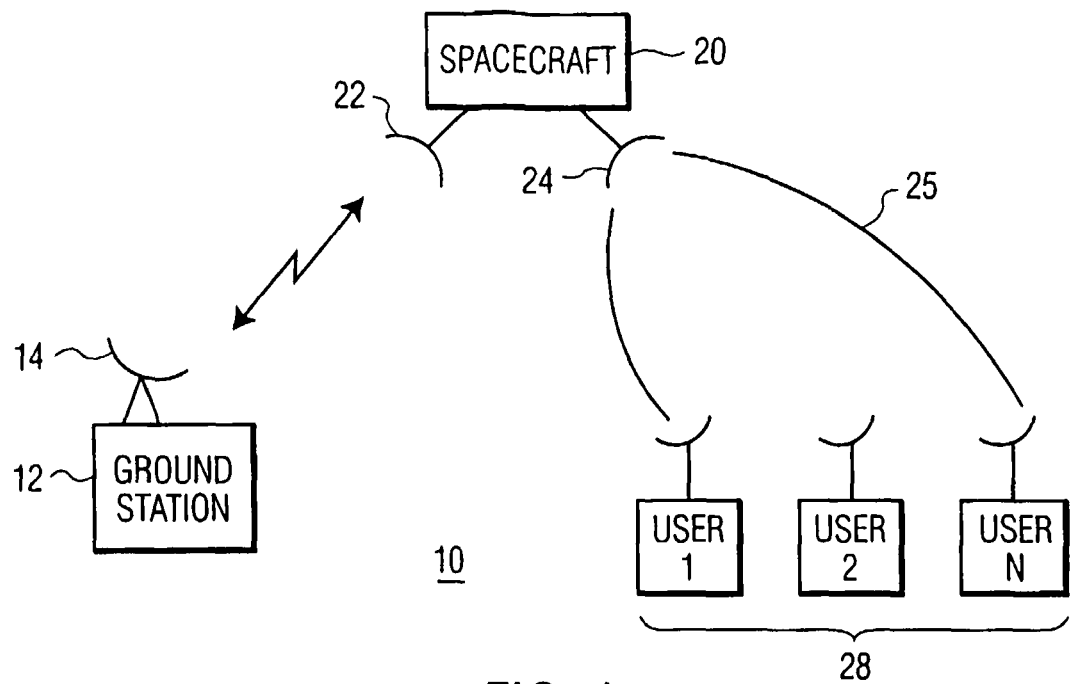
FIG. 1 is a simplified block diagram of a prior art satellite-based subscriber video distribution system.
Figure 5:
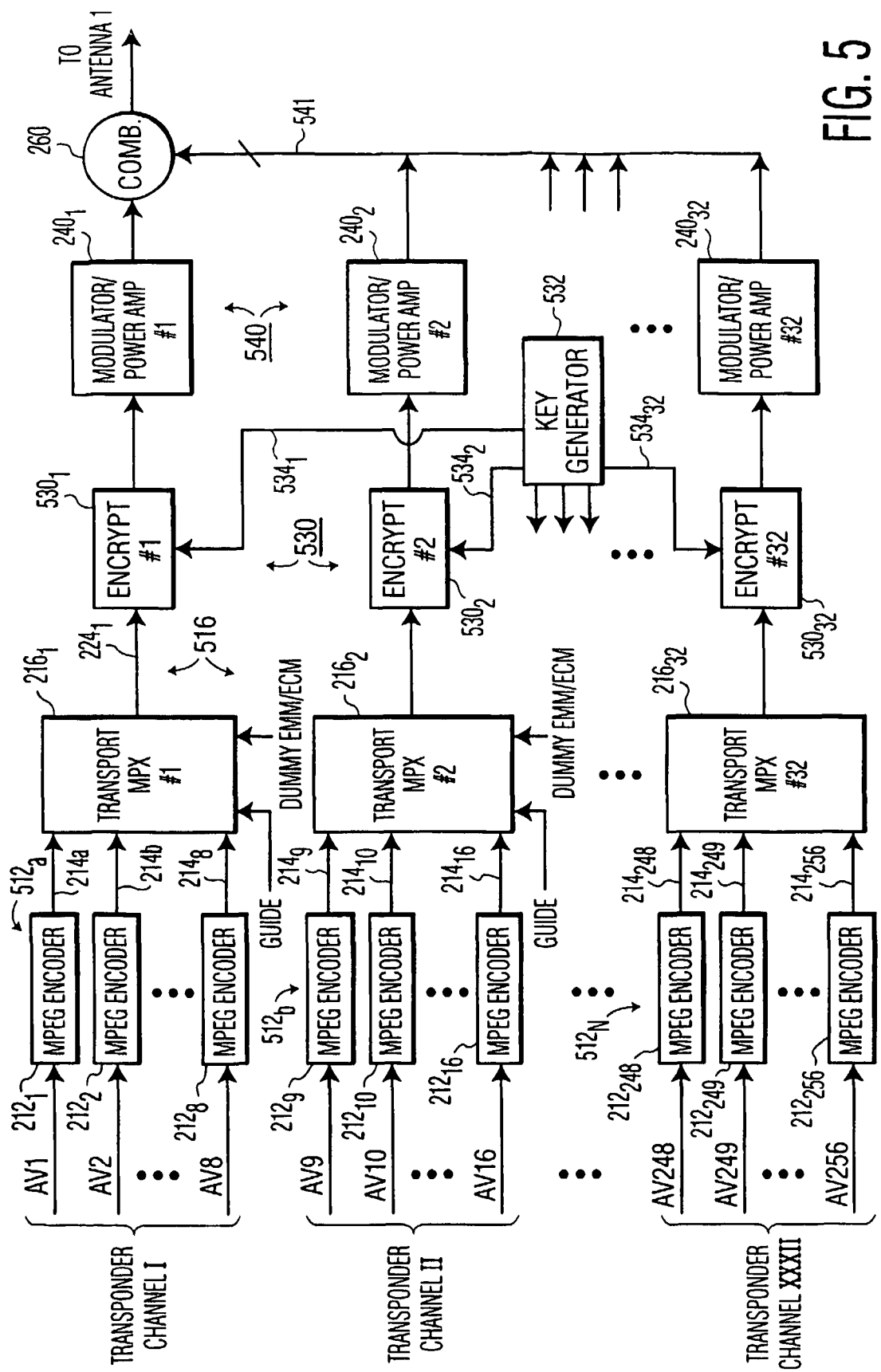
FIG. 5 is a simplified block diagram of a plurality of processing units located at the head end or ground station of the system of FIG. 1 according to an aspect of the invention.

FIG. 5 is a simplified block diagram of a system including a plurality of processing units located at the head end or ground station of the system of FIG. 1 according to an aspect of the invention. In FIG. 5, it is assumed that 32 transponder channels are available on the satellite (not illustrated in FIG. 50), each capable of handling 8 audio/visual (AV) channels, together with EMM/ECM and other ancillary information. Of course, more or fewer transponder channels may be available, and each transponder channel may be capable of handling more or fewer A/V channels, and the corresponding numbers of elements in FIG. 5 are adjusted accordingly. In the arrangement of FIG. 5, a set of eight AV channels $AV_1, AV_2, \ldots, AV_8$ (one spacecraft transponder's worth of signals) are applied to the inputs of a corresponding set $512_1$, of eight MPEG encoders $212_1, 212_2, \ldots, 212_8$, which perform MPEG encoding as in the arrangement of FIG. 2b. The MPEG-encoded AV information is coupled from encoders $212_1, 212_2, \ldots, 212_8$ to first transport multiplexer (MPX) $216_1$, of a set 516 of transport multiplexers, which also receives guide and dummy EMM/ECM information as in the arrangement of FIG. 2b, for time-division multiplexing the data onto a single path $224_1$. The time-division multiplexed data is coupled to a first encryptor $530_1$, of a set 530 of encryptors, for encryption by means of a key applied over a path $534_1$. Similarly, a set of eight A/V channels $AV_9, AV_{10}, \ldots, AV_{16}$ are applied to the inputs of a corresponding set 512b of eight MPEG encoders $212_9, 212_{10}, \ldots, 212_{16}$, which perform MPEG encoding in the same manner as encoders $212_1, 212_2, \ldots, 212_8$. The MPEG-encoded AV information is coupled from encoders $212_9, 212_{10}, \ldots, 212_{16}$ to second transport multiplexer (MPX) $216_2$ of set 516, which also receives guide and dummy EMM/ECM information, for time-division multiplexing the data onto a single path $224_2$. The time-division multiplexed data is coupled to a second encryptor $530_2$ of set 530 for encryption by means of a key applied over a path $534_2$. Other groups of eight AV signals are similarly handled. For completeness, the last group is described, namely group of AV signals AV248, AV249, . . . , AV256. In particular, a set of eight A/V channels $AV_{248}, AV_{249}, \ldots, AV_{256}$ is applied to the inputs of a corresponding set of eight MPEG encoders $212_{248}, 212_{249}, \ldots, 212_{256}$ of set 512N, which perform MPEG encoding in the same manner as encoders $212_1, 212_2, \ldots, 212_8$. The MPEG-encoded AV information is coupled from encoders $212_{248}, 212_{249}, \ldots, 212_{256}$ to thirty-second transport multiplexer (MPX) $216_{32}$ of set 516, which also receives guide and dummy EMM/ECM information, for time-division multiplexing the data onto a single path $224_{32}$. The time-division multiplexed data is coupled to a thirty-second encryptor $530_{32}$ of set 530 for encryption by means of a key applied over a path $534_{32}$. The keys are generated by a key generator block illustrated as 532.

Figure 2A:
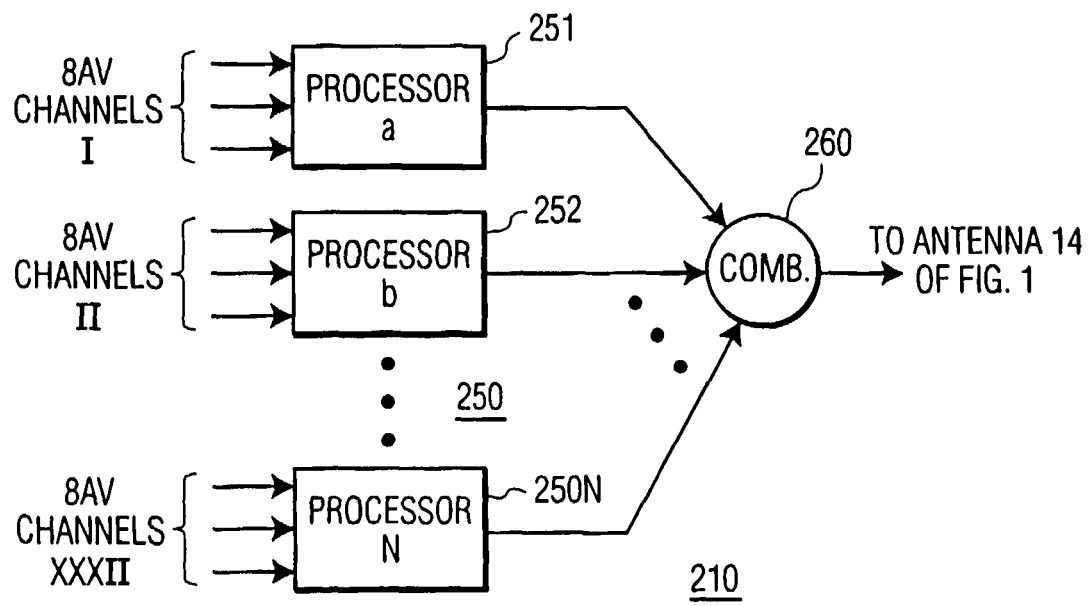
FIG. 2a is a simplified block diagram of a plurality of processing units located at a head end or ground station of the system of FIG. 1.
Figure 2B:
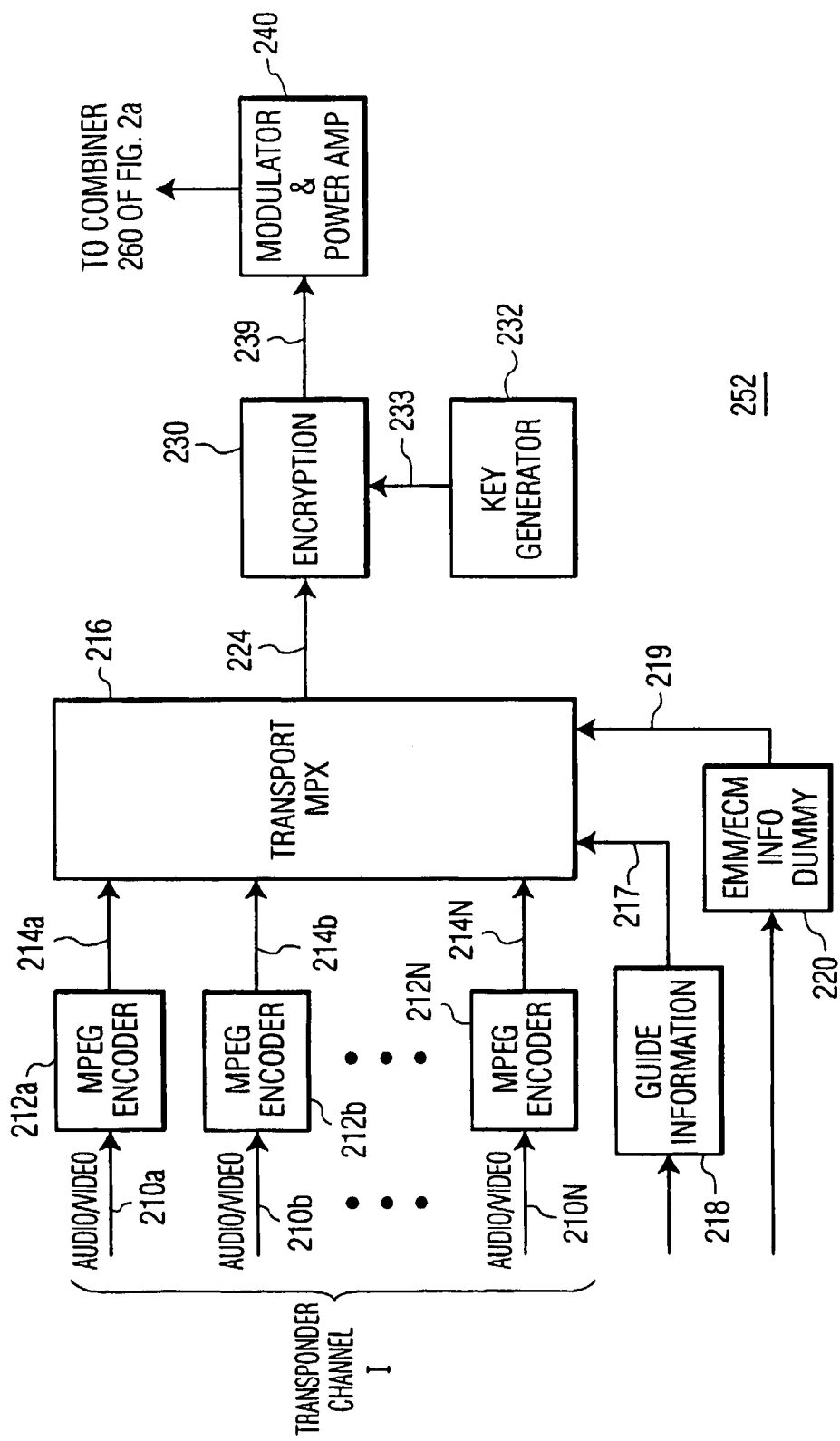
FIG. 2b illustrates details of one of the processing units of FIG. 2a, and FIG. 2c represents the manner in which the various keys are inserted by the encryptor of FIG. 2b into the locations of the dummy EMM/ECM data in the data stream.
Figure 2C:
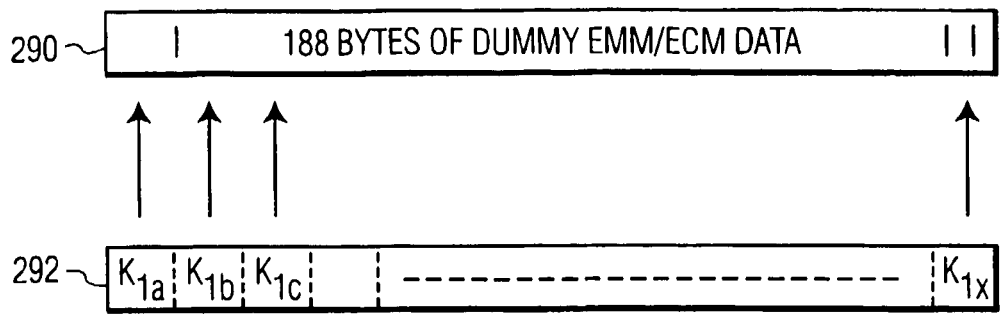
Figure 3:
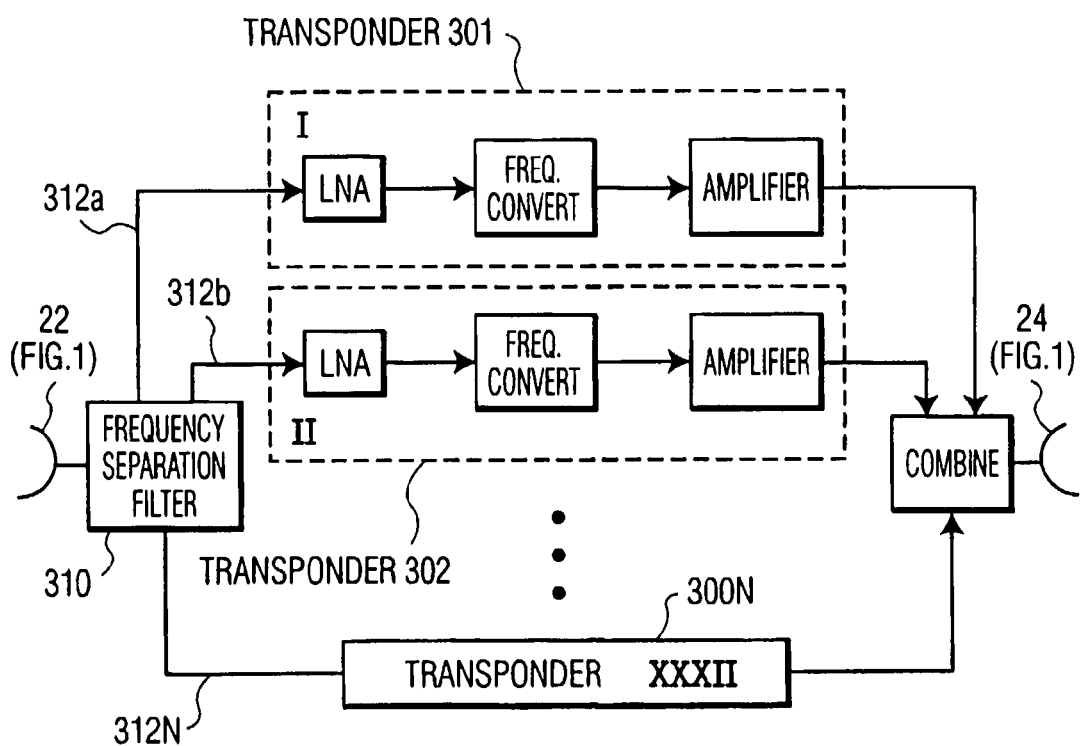
FIG. 3 is a simplified block diagram of the transponder arrangement of the spacecraft of FIG. 1.
Figure 4:
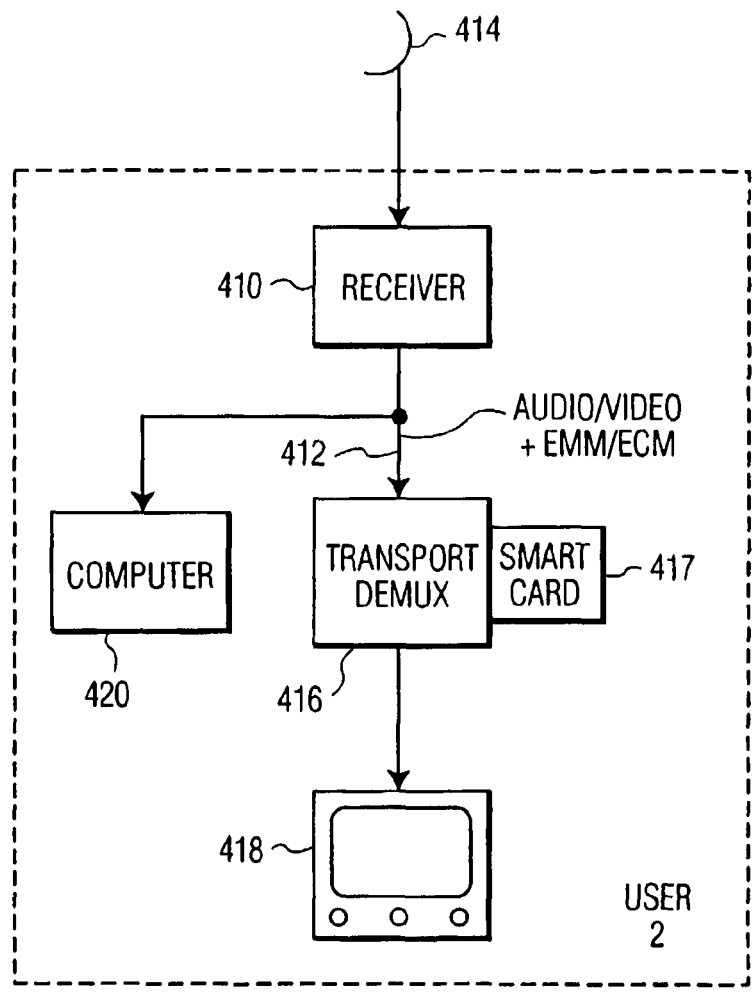
FIG. 4 is a simplified block diagram of the equipment that an ultimate user of the system of FIGS. 1, 2a, 2b, and 3 may have available.

Encryptors $530_1, 530_2, \ldots, 530_{32}$ of set 530 of FIG. 5 differ somewhat from the corresponding encryptors of FIG. 2b. More particularly, each encryptor of set 530 of encryptors does not load the key information into the stream of data as described in conjunction with FIG. 2c. Taking encryptor $530_1$ as being representative, the key information is distributed in the manner illustrated in FIG. 6.

In FIG. 6, the keys which are inserted into the dummy EMM/ECM slots by encryptor $530_1$, of FIG. 5 are arranged in a manner such that at least some of the slots contain keys or key portions from other transponder channels. More particularly, the key information distribution represented in FIG. 6 includes keys $K_{1a}$, $K_{2a}$, $K_{3a}$, $K_{4a}$, $K_{5a}$, ..., $K_{Na}$. Key $K_{1a}$ provides partial decoding information for program 1, corresponding to AV1 of FIG. 5, which program is carried on the same transponder channel as $K_{1a}$. However, keys $K_{2a}$, $K_{3a}$, $K_{4a}$, $K_{5a}$, ..., $K_{Na}$ carry partial decryption information for programs carried on transponder channels other than the first transponder channel. That is, keys $K_{2a}$, $K_{3a}$, $k_{4a}$, $K_{5a}$, .., $K_{Na}$ are related to program a on transponder channels 2, 3, 4, 5, ..., N, respectively. The remaining portions of the program 1 key, namely $K_{1b}$, $K_{1c}$, $k_{1d}$, $K_{1e}$, ..., $K_{1n}$ are carried on other transponder channels. Similarly, the remaining portions of the keys for programs 2 through N are distributed among various transponder channels. Thus, the corresponding set of keys on the second transponder channel, corresponding to AV9, AV10, ..., AV16 of FIG. 5, could include, for example, K1b, K2b, K3b, K4b, K5b, ..., KNb, which would be the keys for decoding the second (b) program on each of the transponder channels. Other encryptors of set 530 of encryptors of FIG. 5 carry other sets of keys. The last encryptor of FIG. 5, namely encryptor $530_{32}$, inserts encryption keys K1m, K2m, K3m, K4m, K5m, . KNm into its dummy EMM/ECM locations in the data stream. Thus, all the keys are transmitted, but many of them are transmitted over transponder channels other than those carrying the corresponding program. In essence, the smaller sub-units K1a, K1b, K1c, ..., K1X of a key K1 together constitute the information contained in K1; each sub-unit might represent one byte, or a group of bytes, of the information in K1, and these sub-units are distributed for substantially simultaneous transmission over a plurality of channels.

In the context of a traditional spacecraft delivery system, the distribution of the keys for the various programs among the spacecraft transponders might not be acceptable, because of the inability of the single-transponder-channel receiver 410 to receive the keys for all the associated program material. According to an aspect of the invention, a multiple-transponder-channel receiver is used at the subscriber location to receive at least the number of channels required to access both a program and the associated encryption key(s). In the simplest case, such as that described in conjunction with FIG. 6, a two-transponder-channel receiver would be required, one for the program on a given transponder, and a second for the corresponding key, which would, in general, be on a different transponder. Thus, when it is desired to receive program a from transponder channel 3, the program is accessed through transponder channel 3, but the corresponding key K3a is retrieved from transponder channel 1 (illustrated in FIG. 6). Thus, a multichannel receiver is required, in general, in order to access both a program and its associated key.

FIG. 7b illustrates the general tenor of the key distribution according to an aspect of the invention. In FIG. 7b, the processors 251, 252, ..., 250N include their individual encryption blocks 216a, 216b, ..., 216N, respectively, as in FIG. 7a. A key generator and decomposer illustrated in FIG. 7b as a block 232'generates the keys, but distributes them differently than does generator 232 of FIG. 7a. More particularly, generator 232'produces key 1 in the form of $ECM_a$, key 2 in the form of $ECM_b$, ..., and $key_N$ in the form of $ECM_N$. In this context, $ECM_a$=$key_1$a; $key_2$a; . $key_N$a, $ECM_b$=$key_1$b; $key_2$b; ..., $key_N$b, ..., and $ECM_N$=$key_1$a; $key_2$a; ..., $key_N$a.

More complex assignments of the key information are possible. For example, it is possible to degenerate a key into two or more portions, and to transmit each of the two portions on a different transponder channel. A multichannel receiver will still be able to access all of the keys for all of the programs, so long as the additional processing power is available. In general, each key could be broken into many portions, and a multichannel receiver at the subscriber end can reconstitute the appropriate key, so long as the locations of the various portions are known.

FIG. 8a is a simplified illustration of the information stream in a traditional system such as a cable television system in which each separate "transponder" channel is on (or "in") a different frequency range of the cable. In FIG. 8a, three transponder channels are illustrated, namely transponder channels 1, 2, ..., n. The letter "V" represents a video packet, the letter "A" represents an audio packet, the letter "E" represents EMM information, and the subscript refers to the particular program to which the packet relates. In transponder channel 1, the sequential flow of packets is V1, V1, A1, E1, V1, V1, A1, E1, V1, V1, A1, E1, ..., all relating to program information 1. In essence, transponder channel 1 carries all the program 1 information, together with its EMM information. Similarly, transponder 2 carries sequential packets V2, V2, A2, E2, V2, V2, A2, E2, V2, V2, A2, E2 ... and transponder n carries sequential packets Vn, Vn, An, En, Vn, Vn, An, En, Vn, Vn, An, En. Each transponder channel thus carries its own program material and the associated code. Since the ECM key information is often provided every few milliseconds, so that a subscriber making a new connection does not have to wait too long for appearance of a decrypted program, and since the ECM keys change every few seconds, as for example every 30 seconds, it is possible to break the ECM information in time rather than in data content. This is illustrated in FIG. 8b, in which transponder 1 carries program information 1, transponder 2 carries program information 2, ..., and transponder n carries program information n. In the arrangement of FIG. 8b, by contrast with the arrangement of FIG. 8a, the ECM information is switched among the various transponder channels. More particularly, in FIG. 8b, transponder channel 1 carries sequential packets V1, V1, A1, E1, V1, V1, A1, E2, V1, V1, A1, En, ..., transponder channel 2 carries sequential packets V2, V2, A2, E2, V2, V2, A2, En, V2, V2, A2, E1, ..., and transponder channel n carries sequential packets Vn, Vn, An, En, Vn, Vn, An, E1, Vn, Vn, An, E2, .... Thus, in the arrangement of FIG. 8b, the complete ECM message required to decode or decrypt the program data is broken into time sequential portions, such as portions E1, E2, ..., En, and these time-sequential portions of the complete ECM message are switched among the various individual channels.

The multichannel receiver may be an array of conventional tuned receivers, or it may be the abovementioned alias-cancelling multichannel receiver.

Those skilled in the art know that the functions of a system may be illustrated with some functions of a block incorporated into the adjacent block, without any change to the essence of the invention. For example, while the decomposition of the keys has been illustrated in FIG. 7b as being performed by a "key generator and decomposer" block 232', the keys could be generated and distributed to all the encryption blocks 216a, 216b, ..., 216N, and the decomposition could be performed in the encryption blocks. Further, the examples have illustrated transmission over a physical channel of keys arranged in a particular ordering, but the ordering of the keys need follow no particular rule. While the description has referred to breaking the keys into portions, and transmitting the portions over different transponders, it is possible to transmit ECM information for a program in complete form over a transponder other than the one on which the encrypted data is transmitted.

A method according to an aspect of the invention is for communicating data over plural channels (301, 302, ..., 300N). The method comprises the steps of selecting data to be communicated (A/V information), encryption information ($K_1a, K_2a, K_3a, \ldots, K_Na$) and encrypting the data with the encryption information to thereby produce encrypted data. The selected data may be video information. The encryption information is broken into portions ($ECM_a, ECM_b, \ldots, ECM_N$). The encrypted data is communicated by way of at least one channel (transponder channel I) of the plural channels (301, 302, ..., 300N). In one mode of the method, the encrypted data is communicated over but a single channel (transponder channel I). At least some of the portions of the encryption key information are communicated over at least one of the plural channels (301, 302, ..., 300N) other than a channel over which the encrypted data is communicated.

According to another aspect of the invention, a method for providing program information to subscribers (426) comprises the steps of selecting a plurality of information streams (A/V information) to be communicated to the subscribers, and encoding each of at least some of the information streams with individual entitlement control information to thereby generate entitlement encoded information streams. Each element of the individual entitlement control information is broken into plural portions. The encoded information streams are communicated to the subscribers, with each of the encoded information streams being communicated over one of a plurality of independent channels (301, 302, ..., 300N), or at least over fewer than all the physical channels. The plural portions of the entitlement control information are communicated to the subscribers, with at least some of the portions of each entitlement control information being communicated over separate ones of the independent channels (301, 302, ..., 300N). When different subscribers have different program entitlements, the method comprises the further step of generating individual entitlement management commands identifying those information streams of a particular program to which a corresponding subscriber is entitled. Each of the individual entitlement management commands is broken into plural portions. The entitlement management commands are communicated to the subscribers over at least some of the independent channels (301, 302, ..., 300N), with at least some of the portions of each of the individual entitlement management commands being communicated over separate ones of the independent channels (301, 302, ..., 300N). At each subscriber location, the information is simultaneously decoded in at least plural ones of the independent channels to thereby form decoded information. From the decoded information, at least that one of the individual entitlement management commands applicable to the subscriber is reconstituted, to thereby form a reconstituted entitlement management command. According to a further mode of this aspect of the method of the invention, only those of the information streams, entitlement encoded information streams, and entitlement control information corresponding to the reconstituted entitlement management command are made available.

A method according to another aspect of the invention is for providing program information to subscribers, where each subscriber has one of a plurality of different program entitlements. This method comprises the steps of selecting a plurality of information streams to be communicated to the subscribers, and encoding each of at least some of the information streams with individual entitlement control information to thereby generate entitlement encoded information streams. According to this aspect of the invention, the method breaks each element of the individual entitlement control information into plural portions. The information streams are communicated to the subscribers, with each of the information streams being communicated over one of a plurality of independent channels (301, 302, ..., 300N). The plural portions of the entitlement control information are communicated to the subscribers, with at least some of the portions of each individual entitlement control information being communicated over separate ones of the independent channels (301, 302, ..., 300N). Individual entitlement management commands are generated, identifying those information streams of a particular program to which a corresponding subscriber is entitled. Each of the individual entitlement management commands is broken into plural portions. The entitlement management commands are communicated to the subscribers over at least some of the independent channels (301, 302, ..., 300N), with at least some of the portions of each of the individual entitlement management commands being communicated over separate ones of the independent channels. At each subscriber location, the information in at least plural ones of the independent channels is simultaneously decoded to thereby form decoded information, and from the decoded information, at least that one of the individual entitlement management commands applicable to the subscriber is reconstituted, to thereby form a reconstituted entitlement management command. At each the subscriber location, only those of the information streams, entitlement encoded information streams, and entitlement control information corresponding to the reconstituted entitlement management command is made available for display.

What is claimed is:

1. A method for communicating a program signal, comprising the steps of:
   encrypting the program signal using encryption information to produce an encrypted program signal;
   dividing the encryption information into a plurality of encryption information portions;
   communicating the encrypted program signal via a first communications channel, the encrypted program signal being transmitted via first transport packets, each first transport packet having a first identifier associated with the program signal; and
   communicating the plurality of encryption information portions via a second communications channel that is independent of the first communications channel, the encryption information portions being transmitted via second transport packets, each second transport packet having a second identifier associated with the encryption information, the first and second communications channels being associated with independent first and second transponders of a single data delivery system.

2. The method according to claim 1, wherein the step of communicating the plurality of encryption information portions comprises communicating the plurality of encryption information portions via a plurality of communications channels that are independent of the first communications channel, the first and the plurality of communications channels being associated with independent first and second transponders, respectively of a single data delivery system.

3. The method according to claim 2, wherein each of the plurality of encryption information portions is transmitted over a respective unique one of the plurality of communications channels that is independent of the first communications channels.

4. The method according to claim 2, wherein the program signal is representative of a television program, and the encryption information corresponds to an entitlement control message.

5. The method according to claim 4, wherein the plurality of communications channels comprise satellite data paths.

6. The method according to claim 3, wherein the program signal is representative of a television program, and the encryption information corresponds to an entitlement control message.

7. A method of receiving and processing a program signal, comprising:
- simultaneously receiving data via a plurality of communications channels, including receiving an encrypted program signal via a first communications channel, the encrypted program signal transmitted via first transport packets, each first transport packet having a first identifier associated with the program signal, and receiving a plurality of encryption information portions via a second communications channel that is independent of the first communications channel, the encrypted information portions transmitted via second transport packets, each second transport packet having a second identifier associated with encryption information, the first and second communications channels being associated with independent first and second transponders of a single data delivery system;
- assembling the plurality of encryption information portions to recover the encryption information; and
- decrypting the encrypted program signal using the recovered encryption information to generate the program signal.

8. The method according to claim 7, wherein the step of receiving the plurality of encryption information portions comprises receiving the plurality of encryption information portions via a plurality of communications Channels that are independent of the first communications channel, the first and the plurality of communications channels being associated with independent first and second transponders, respectively. of a single data delivery system.

9. The method according to claim 8, wherein each one of plurality of encryption information portions is received via a respective unique communications channel of the plurality of communications channels.

10. The method according to claim 8, wherein the program signal corresponds to a television program signal and the encryption information comprises an entitlement control message.

11. The method according to claim 9, wherein the program signal corresponds to a television program signal and the encryption information comprises an entitlement control message.

12. A method of receiving a television program signal via a satellite path, comprising:
- receiving a user command selecting a program associated with a first channel;
- simultaneously tuning to a plurality of channels to receive data via the plurality of channels, including receiving an encrypted program signal associated with the selected program via the first channel, the encrypted program signal transmitted via first transport packets, each first transport packet having a first identifier associated with a program signal, and receiving a plurality of encryption information portions via a second channel that is independent of the first channel, the encryption information portions transmitted via second transport packet, each second transport packet having a second identifier associated with encryption information, the first and second communications channels being associated with independent first and second transponders of a single data delivery system;
- assembling the plurality of encryption information portions to recover the encryption information;
- decrypting the encrypted program signal using the recovered encryption information to generate the program signal;
- processing the program signal to generate a display signal.

13. The method according to claim 12, wherein the step of receiving the plurality of encryption information portions comprises receiving the plurality of encryption information portions via a plurality of channels that are independent of the first channel, the first and second communications channels being associated with independent first and second transponders of a single data delivery system;

14. The method according to claim 12, wherein each one of plurality of encryption information portions is received via a respective unique channel of the plurality of channels.

15. An apparatus, comprising:
- means for simultaneously receiving data from a plurality of communications channels;
- control means, coupled to the receiving means, for selecting channels received by the receiving means;
- processing means, coupled to the receiving means, for processing data received via the plurality of communications channels;
- user input means for receiving user commands including selection of a program associated with a first communications channel, wherein
- the control means causes the receiving means to receive an encrypted program signals associated with the selected program via the first communications channel in response to a user command, the encrypted program signal transmitted via first transport packets, each first transport packet having a first identifier associated with a program signal, and receive a plurality of encryption information portions via a second communications channel that is independent of the first communications channel, the encryption information portions transmitted via second transport packets, each second transport packet having a second identifier associated with encryption information, the first and second communications channels being associated with independent first and second transponders of a shale data delivery system, the processing means assembling the encryption information portions to generate the encryption information and decrypting the encrypted program signal using the assembled encryption information.

16. The apparatus according to claim 15, wherein the receiving means receives the plurality of encryption information portions via a plurality of communications channels that are independent of the first communications channel, the first and the plurality of communications channels being associated with independent first and second transponders. respectively, of a single data delivery system.

17. The apparatus according to claim 15, wherein the receiving means receives each of the plurality of encryption information portions via a respective unique communications channels that is independent of the first communications channel.

18. The apparatus according to claim 17, wherein the program comprises a television program and the encryption information comprises an entitlement control message.

19. The apparatus according to claim 18, wherein the communications channels correspond to satellite transmission channels.

* * * * *